United States Patent [19]
Viertel et al.

[11] Patent Number: 6,024,399
[45] Date of Patent: Feb. 15, 2000

[54] SUN VISOR FOR VEHICLES

[76] Inventors: Lothar Viertel, Lilienstrasse 4, D-66802 Altforweiler, Germany; Patrick Welter, 12, Rue Principal, F-57730 La Chambre, France

[21] Appl. No.: 09/120,514

[22] Filed: Jul. 22, 1998

[30] Foreign Application Priority Data

Jul. 22, 1997 [DE] Germany .................. 197 31 393

[51] Int. Cl.[7] ................................................ B60J 3/02
[52] U.S. Cl. ................................ 296/97.11; 296/97.1
[58] Field of Search ................ 296/97.1, 97.09, 296/97.11, 97.12, 97.13

[56] References Cited

U.S. PATENT DOCUMENTS

| | | | |
|---|---|---|---|
| 4,998,765 | 3/1991 | Van Order et al. | 296/97.11 |
| 5,011,211 | 4/1991 | Svensson | 296/97.1 |
| 5,308,136 | 5/1994 | Schwarz et al. | 296/97.1 |
| 5,318,336 | 6/1994 | Aymerich et al. | 296/97.5 |
| 5,454,616 | 10/1995 | Aymerich et al. | 296/97.1 |
| 5,653,490 | 8/1997 | Fink et al. | 296/97.11 |
| 5,860,690 | 1/1999 | Dellinger et al. | 296/97.1 |

*Primary Examiner*—D. Glenn Dayoan
*Assistant Examiner*—Paul Chenevert
*Attorney, Agent, or Firm*—Harness, Dickey & Pierce, P.L.C.

[57] ABSTRACT

The present invention is directed to a sun visor, which has a sun visor body made of a plastic material, and a tube body made of a metal, such as aluminum. The tube body extends in the upper longitudinal edge of the sun visor body essentially over the longitudinal extension of the tube body, which stabilizes the sun visor body. The tube body is used as a guide for a sliding body connected with a shaft, which is intended to be used for the axial displacement of the sun visor body. In connection with this sun visor, the sun visor body is comprised of expanded polypropylene (EPP) plastic materials, the width of the tube body is equal to or slightly less than the thickness of the sun visor body and the EPP material only adjoins the wall area of the tube body facing away from the free longitudinal edge of the sun visor body. For the purpose of assuring a solid connection with the EPP material of the sun visor body during its production, the tube body is provided with a covering, at least in the wall area adjoining the EPP material, which is capable of entering into a solid connection with the EPP material.

16 Claims, 2 Drawing Sheets

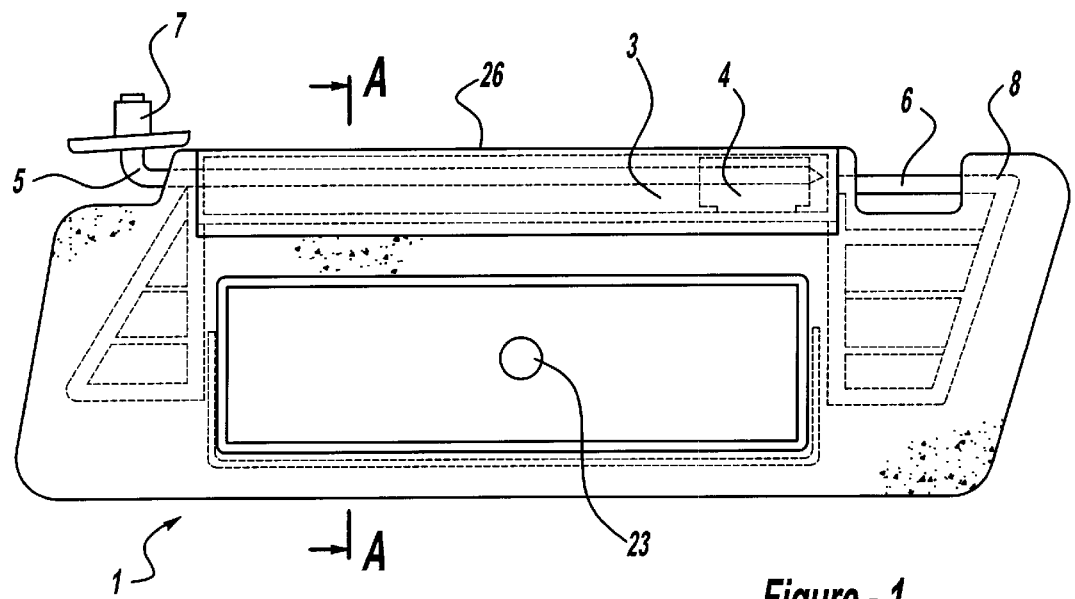
Figure - 1
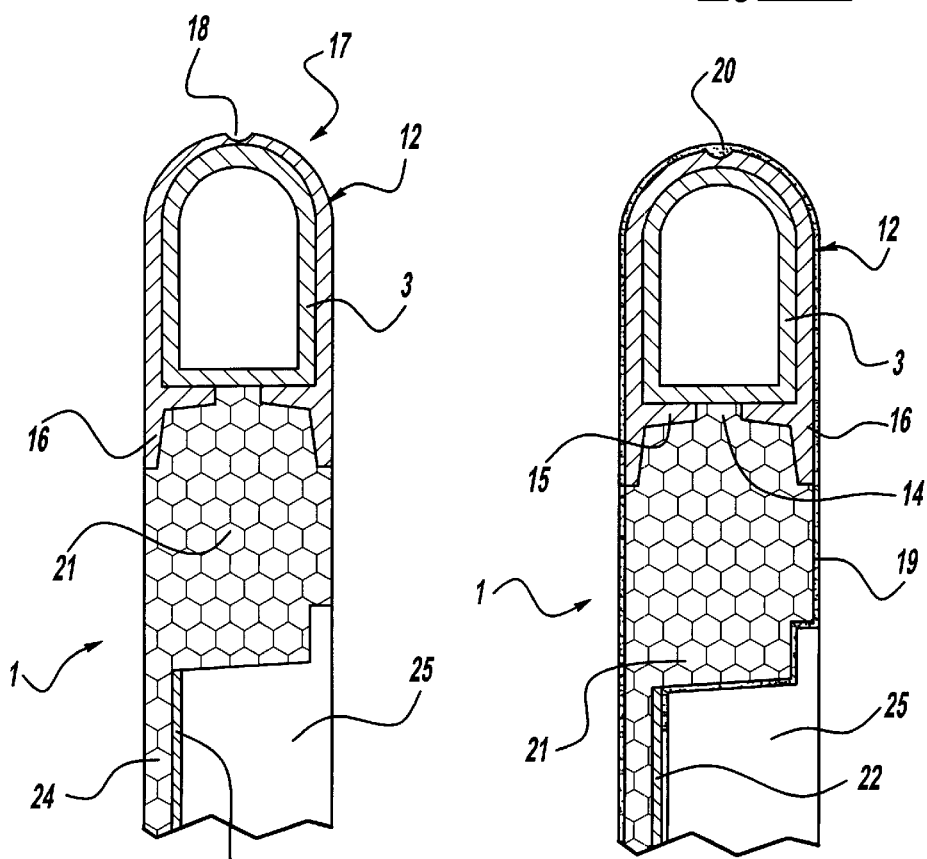
Figure - 5
Figure - 6

SUN VISOR FOR VEHICLES

FIELD OF THE INVENTION

The invention relates to a sun visor for vehicles. The sun visor has a sun visor body made of a plastic material and a tube body made of a metal, such as aluminum. The tube body extends in the upper longitudinal edge of the sun visor body essentially over the longitudinal extension of the tube body, which stabilizes the sun visor body. The tube body is also used as a guide for a sliding body connected with a shaft, which is intended to be used for the axial displacement of the sun visor body.

BACKGROUND OF THE INVENTION

A sun visor of the type is shown and described in European Patent Publication EP 0 231 440 B 1. With the known sun visor, which has proven itself in an outstanding manner in practical use, the tube body is embedded in the area of the upper longitudinal edge of the sun visor body. In other words, the tube body is enclosed in the plastic material of the sun visor body. Because of this, the known sun visor has a thickness which is no longer acceptable to today's customers. To keep the thickness of the sun visor bodies within limits, they are made of a polyurethane (PU) material because this material is able to be foamed around the tube body with a relatively thin covering layer and without creating void places. However, a PU material is not preferred by automobile manufacturers because other plastic materials are available which have particular advantages with respect to their weight by volume and their recyclability. However, these plastic materials cannot be shaped with an extremely low layer thickness around the tube body, so that the problem of the undesired thickness of the sun visor body arises again.

SUMMARY OF THE INVENTION

It is therefore an object of the present invention to make available a sun visor of the type mentioned above which has a sun visor body which, on the one hand, is intended to be made from a light, easily recyclable plastic material and, on the other hand, has an extremely reduced thickness, which corresponds to the ideas of the customers, but still also completely meets the technical requirements.

The use of expanded polypropylene particle (EPP) plastic materials results in the desired advantages regarding weight and recyclability, but these materials only became possible after considerable difficulties had been overcome. It had first been necessary to understand that embedding the tube body in the EPP material leads to an unacceptable thickness of the sun visor body. Tests have shown that enclosing the tube body in EPP material could only be achieved with a wall thickness which, at a minimum, results from 1.5 times the bead size of the EPP material, and is approximately 4 millimeters (mm). However, it was not possible with such a wall thickness for the tube body enclosure to achieve the required strength between the tube body and the EPP material of the sun visor body. The result was a sun visor body which was too thick and yet which did not meet the strength requirements. The present invention thus produces a sun visor body of the desired thickness, strength and recyclability.

Another object of the present invention is to have uniformity of the types of the materials and to have a molecular bonding during the production of the sun visor body. Another object of the present invention is to provide a simple and cost-effective embodiment of a covering for the tube body. Another object of the present invention is to provide an easier application of the covering on the tube body. Another object of the present invention is to provide optimal adhesion of the EPP material on the covering.

One aspect of the present invention provides a sun visor for vehicles which includes a sun visor body made of a plastic material, wherein the plastic material is comprised of expanded polypropylene (EPP) materials. The sun visor body has an upper longitudinal edge and includes a tube body made of metal. The tube body extends near the upper longitudinal edge of the sun visor body essentially over the longitudinal extension of the tube body, thereby stabilizing the sun visor body. The width of the tube body is equal to or slightly less than the thickness of the sun visor body. A sliding body is also provided, wherein the tube body is a guide for the slide body to be used for the axial displacement of the sun visor body. Last, a shaft is connected to the sliding body.

The EPP material of the sun visor body only adjoins the wall area of the tube body facing away from the upper longitudinal edge of the sun visor body. Additionally, a covering is also provided so that, for the purpose of assuring a solid connection with the EPP material of the sun visor body during its production, at least in the wall area adjoining the EPP material, the covering enters into a good material contact with the EPP material.

Preferably, the covering is a polypropylene material. In addition, the covering is preferably made of a section of an extruded profiled strand corresponding to the length of the tube body, which defines an open cross section corresponding to the tube body to receive the tube body. Preferably, the covering includes a continuous longitudinal slit and can be placed over the tube body. Last, the covering preferably includes strips projecting past the tube body, wherein the strips act as a groove for receiving the EPP material and as an enlarged contact surface with the EPP material.

These and other objects, advantages, and features of the present invention will be better understood upon review of the following detailed description of the preferred embodiments.

BRIEF DESCRIPTION OF SEVERAL VIEWS OF THE DRAWINGS

FIG. 1 is a plan view of a sun visor of the present invention;

FIG. 5 is a sectional view along the line A—A in FIG. 1; and

FIG. 6 is a sectional view of FIG. 5 with the covering enclosing the sun visor body.

DETAILED DESCRIPTION OF THE PREFERRED EMBODIMENTS

Figure 3:
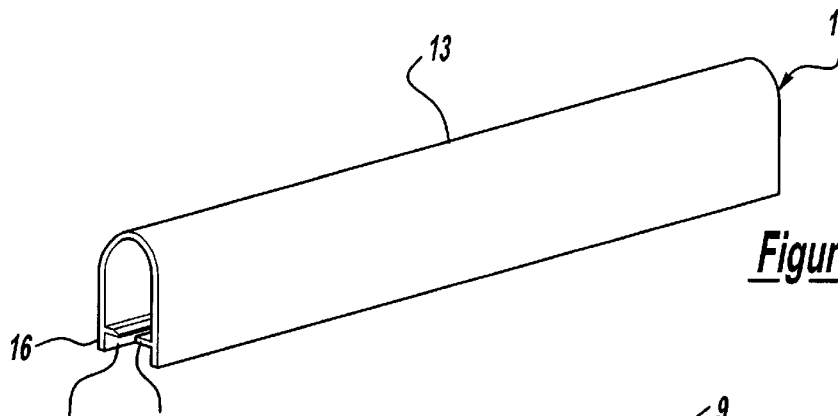
FIG. 3 is a perspective view of the covering of the sun visor illustrated in FIG. 1.

As shown in FIG. 1, the novel sun visor of the present invention includes a sun visor body 1, which has a tube body 3 in the area of its upper longitudinal edge 26. A sliding body 4 is axially displaceable in the tube body 3 and is connected with a shaft 5. Furthermore, the sun visor has an opposed bearing pin 6 for snapping into an opposed bearing (not shown). The shaft 5 is approximately "L-shaped," with the long leg of the "L" being received in the sliding body 4 and the short leg of the "L" being received in a pivot bearing housing 7. The sun visor body 1 is usually arranged on the long leg of the shaft 5 in the position seen in FIG. 1. In order that the sun visor body 1 may offer improved protection from incoming light or other light effects, a displaceable arrangement on the long leg of the shaft 5 is provided.

Figure 2:
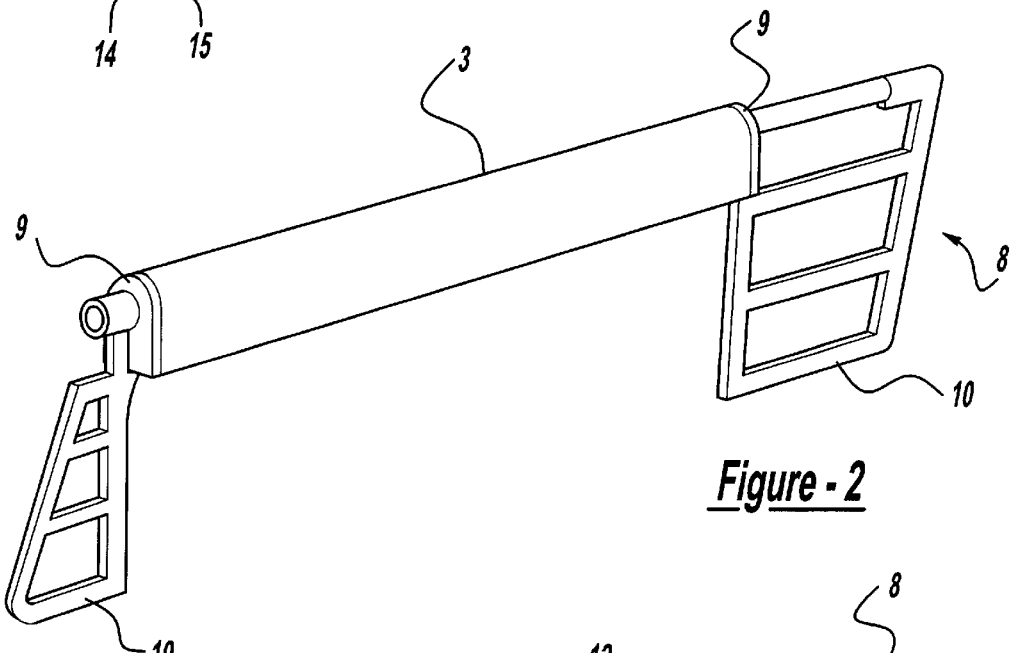
FIG. 2 is a perspective view of the insert of the sun visor illustrated in FIG. 1.
Figure 4:
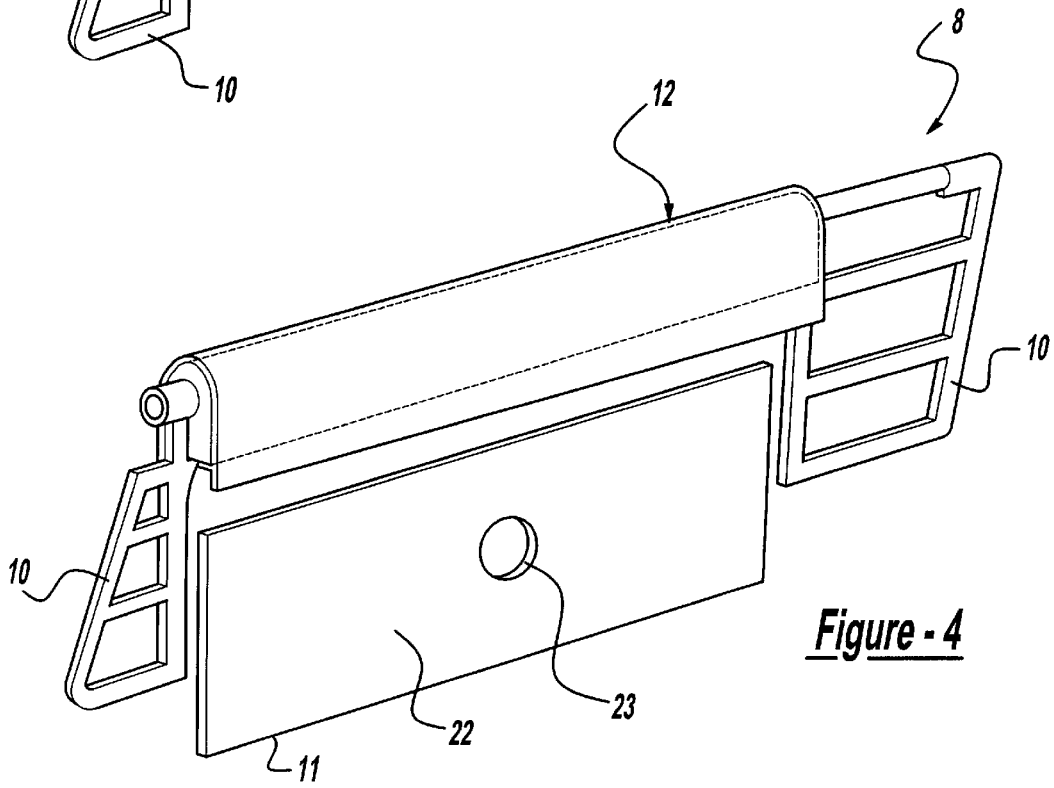
FIG. 4 is a perspective view of the covering placed over the tube body of the insert of the sun visor illustrated in FIG. 1.

The sun visor body 1 is comprised of expanded polypropylene (EPP) particles and, as shown in FIGS. 1 and 4, is equipped with an insert 8. As shown in FIG. 2, the insert 8 includes the tube body 3 and a plastic element 10. The plastic element 10 is connected by means of plugs 9 to the ends of the tube body 3. Preferably, as shown in FIG. 4, a trough bottom stiffening plate 11 is also provided. The tube body 3 is preferably made of a metal, such as aluminum or an aluminum alloy.

In order to be able to produce a sun visor body 1 of the least possible thickness, the tube body 3 is not enclosed in the EPP material of the sun visor body 1. Instead, as shown in FIGS. 5 and 6, the tube body 3 has a thickness which approximately corresponds to the rest of the sun visor body 1, or, preferably, is thinner than the sun visor body 1 made of EPP material. As shown in FIGS. 2 through 6, a covering 12, whose dimensions and shape are predetermined, encloses the tube body 3. By means of the covering 12, the sun visor body 1 is given the same thickness as the tube body 3. More importantly, the covering 12 provides a reliable connection between the tube body 3 and the sun visor body 1 (the EPP material) during manufacture. The covering 12, which is made of a polypropylene (PP) material is comprised of a section 13 of an extruded profiled strand. The section 13 can be pushed over the tube body 3, or placed over it, if it is provided with a continuous longitudinal slit 14. The interior dimensions of the PP covering 12 are matched to the exterior dimensions of the tube body 3 in order to assure a fitted seating without play.

When producing the sun visor body 1, the entire insert 8 is placed in a positioned arrangement into the mold nest of a production device, after which the mold nest is filled with PP particles and charged with superheated steam. In the process, the PP particles expand and become welded to each other, as well as to the covering 12. In this manner, the PP covering 12 comes into an absolutely solid connection with the EPP material of the sun visor body 1. Generally, the EPP material of the sun visor body 1 only adjoins the wall area of the tube body 3 facing away from the upper longitudinal edge 26 of the sun visor body 1. The available contact surface between the PP covering 12 and the EPP material of the sun visor body 1 is still considerably increased by transverse strips 15 and extension strips 16 formed on the covering 12.

As shown in FIG. 5, a continuous trough-shaped depression 18 is provided on the outer radius area 17 of the covering 12. The trough-shaped depression 18 is used to receive the welding bead 20 being created in the course of circumferential high-frequency welding of the envelope 19 enclosing the sun visor body 1.

As shown in FIG. 6, by employing the EPP material and processing properties, and employing the production process of EPP bodies, a molecular connection between the EP materials 21 and the walls of the PP covering 12 occurs, thereby providing the required connection. The PP covering 12 also advantageously constitutes a required insulation against the high-frequency electrode during welding of the envelope 19.

In accordance with the described criteria, it is possible and advantageous to replace the present-day elaborate and expensive foamed inserts which are used for the stiffening of the sun visor body and the fastening of the mirror in the trough bottom by, as shown in FIG. 4, a simple, hard PP foil blank 22 with a through-hole 23 for the EPP supply by means of an injector (not shown). A thin and yet sufficiently rigid trough body 24 can be realized by the molecular connection between the EPP material and the PP material of the foil blank 22.

The cutout 25 in the sun visor body is used for receiving an accessory element, such as, for example, a mirror component.

Of course, it should be understood that a wide range of changes and modifications can be made to the embodiments described above. It is therefore intended that the foregoing description illustrates rather than limits this invention, and that it is the following claims, including all equivalents, which define this invention.

What is claimed is:

1. A sun visor for vehicles comprising:
   a sun visor body made of a plastic material, wherein the plastic material is comprised of expanded polypropylene materials, the sun visor body having an upper longitudinal edge,
   the sun visor body including a tube body made of metal, the tube body extending near the upper longitudinal edge of the sun visor body essentially over the longitudinal extension of the tube body, thereby stabilizing the sun visor body, wherein the width of the tube body is equal to or slightly less than the thickness of the sun visor body,
   a sliding body, wherein the tube body is a guide for the slide body to be used for the axial displacement of the sun visor body,
   a shaft connected to the sliding body,
   wherein the expanded polypropylene material of the sun visor body only adjoins the wall area of the tube body facing away from the upper longitudinal edge of the sun visor body, and
   a covering having strip members, wherein for the purpose of assuring a solid connection with the expanded polypropylene material of the sun visor body during its production, the tube body is provided with the covering at least in the wall area adjoining the expanded polypropylene material so that the strip members enter into good material contact with the expanded polypropylene material.

2. The sun visor of claim 1 wherein the covering is a polypropylene material.

3. The sun visor of claim 1 wherein the covering is made of a section of an extruded profiled strand corresponding to the length of the tube body, which defines an open cross section corresponding to the tube body to receive the tube body.

4. The sun visor of claim 1 wherein the covering includes a continuous longitudinal slit and can be placed over the tube body.

5. The sun visor body of claim 1 wherein the expanded polypropylene is formed to the strip members during the expanded forming of the expanded polypropylene.

6. The sun visor of claim 1, wherein the strip members are transverse strips and extension strips.

7. The sun visor of claim 1 wherein the tube body is aluminum or an aluminum alloy.

8. The sun visor of claim 1 wherein the covering is a polypropylene material and is made of a section of an extruded profiled strand corresponding to the length of the tube body, which defines an open cross section corresponding to the tube body to receive the tube body.

9. The sun visor of claim 1 wherein the covering is a polypropylene material and wherein the covering includes a continuous longitudinal slit and can be placed over the tube body.

10. The sun visor of claim 1 wherein the covering is made of a section of an extruded profiled strand corresponding to the length of the tube body, which defines an open cross section corresponding to the tube body to receive the tube body and wherein the covering includes a continuous longitudinal slit and can be placed over the tube body.

11. The sun visor of claim 1 wherein the covering is a polypropylene material and wherein the the strip members project past the tube body, wherein the strip members act as a groove for receiving the expanded polypropylene material and as an enlarged contact surface with the expanded polypropylene material.

12. The sun visor of claim 1 wherein the covering is made of a section of an extruded profiled strand corresponding to the length of the tube body, which defines an open cross section corresponding to the tube body to receive the tube body and wherein the strips act as a groove for receiving the expanded polypropylene material and as an enlarged contact surface with the expanded polypropylene material.

13. The sun visor of claim 1 wherein the strip members include a continuous longitudinal slit and can be placed over the tube body and wherein strip members project past the tube body, wherein the strip members act as a groove for receiving the expanded polypropylene material and as an enlarged contact surface with the expanded polypropylene material.

14. The sun visor of claim 1 wherein the covering is made of a section of an extruded profiled strand corresponding to the length of the tube body, which defines an open cross section corresponding to the tube body to receive the tube body and wherein the strips act as a groove for receiving the expanded polypropylene material and as an enlarged contact surface with the expanded polypropylene material.

15. The sun visor of claim 1 wherein the covering is a polypropylene material and is made of a section of an extruded profiled strand corresponding to the length of the tube body, which defines and open cross section corresponding to the tube body to receive the tube body, wherein the covering includes a continuous longitudinal slit and can be placed over the tube body and wherein the strips act as a groove for receiving the expanded polypropylene material and as an enlarged contact surface with the expanded polypropylene material.

16. A sun visor body for vehicles comprising:

a sun visor body made of a plastic material, wherein the plastic material is comprised of expanded polypropylene materials, the sun visor body having an upper longitudinal edge, the sun visor body including a tube body made of metal, the tube body extending near the upper longitudinal edge of the sun visor body essentially over the longitudinal extension of the tube body, thereby stabilizing the sun visor body, wherein the width of the tube body is equal to or slightly less than the thickness of the sun visor body, a sliding body, wherein the tube body is a guide for the slide body to be used for the axial displacement of the sun visor body, a shaft connected to the sliding body, wherein the expanded polypropylene material of the sun visor body only adjoins the wall area of the tube body facing away from the upper longitudinal edge of the sun visor body, and a covering, wherein for the purpose of assuring a solid connection with the expanded polypropylene material of the sun visor body during its production, the tube body is provided with the covering at least in the wall area adjoining the expanded polypropylene material so that the covering enters into a good material contact with the expanded polypropylene material, wherein the covering is a polypropylene material and is made of a section of an extruded profiled strand corresponding to the length of the tube body, which defines an open cross section corresponding to the tube body to receive the tube body, wherein the covering includes a continuous longitudinal slit and can be placed over the tube body and wherein the covering includes strips projecting past the tube body, wherein the strips act as a groove for receiving the expanded polypropylene material and as an enlarged contact surface with the expanded polypropylene material.

\* \* \* \* \*